United States Patent
MacDonald et al.

(10) Patent No.: US 8,352,320 B2
(45) Date of Patent: Jan. 8, 2013

(54) ADVERTISING MANAGEMENT SYSTEM AND METHOD WITH DYNAMIC PRICING

(75) Inventors: Jonathan MacDonald, Frimley (GB); Donald Peppers, Sea Island, GA (US)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 12/075,593

(22) Filed: Mar. 11, 2008

(65) Prior Publication Data

US 2008/0228893 A1    Sep. 18, 2008

Related U.S. Application Data

(60) Provisional application No. 60/906,366, filed on Mar. 12, 2007.

(30) Foreign Application Priority Data

Jun. 22, 2007   (GB) .................................. 0712280.7

(51) Int. Cl.
*G06Q 30/00* (2006.01)
(52) U.S. Cl. ............... 705/14.66; 705/14.64; 705/14.61; 705/14.69
(58) Field of Classification Search ............... 705/14.66, 705/14.64, 14.61, 14.69
See application file for complete search history.

(56) References Cited

U.S. PATENT DOCUMENTS

| | | | |
|---|---|---|---|
| 5,408,519 A | 4/1995 | Pierce et al. | |
| 5,613,213 A | 3/1997 | Naddell et al. | |
| 5,678,179 A | 10/1997 | Turcotte et al. | |
| 5,978,775 A | 11/1999 | Chen | |
| 5,978,833 A | 11/1999 | Pashley et al. | |
| 6,006,197 A | 12/1999 | d'Eon et al. | |
| 6,009,410 A | 12/1999 | LeMole et al. | |
| 6,023,700 A | 2/2000 | Owens et al. | |
| 6,055,512 A | 4/2000 | Dean et al. | |
| 6,055,513 A | 4/2000 | Katz et al. | |
| 6,057,872 A | 5/2000 | Candelore | |
| 6,097,942 A | 8/2000 | Laiho | |
| 6,286,005 B1 | 9/2001 | Cannon | |
| 6,334,145 B1 | 12/2001 | Adams et al. | |
| 6,338,044 B1 | 1/2002 | Cook et al. | |
| 6,345,279 B1 | 2/2002 | Li et al. | |

(Continued)

FOREIGN PATENT DOCUMENTS

BE    1015704    7/2005

(Continued)

OTHER PUBLICATIONS

Perkins, Ed, "When to buy airfare", http://www.smartertravel.com/travel-advice/when-to-buy-airfare.html?id=1628038, Nov. 21, 2006.*

(Continued)

*Primary Examiner* — Michael Bekerman
(74) *Attorney, Agent, or Firm* — Novak Druce + Quigg LLP

(57) ABSTRACT

Method and system for enabling advertisers to deliver advertisements to consumers in which a plurality of tiers of available advertisements are defined, each tier containing a number of advertisements, a price for allocation of an advertisement in each tier is set wherein a lowest tier has the lowest price and the price increases to a maximum at a highest tier, and advertisements are allocated to advertisers based on availability starting from a lowest tier with unallocated advertisements and progressing to higher tiers.

46 Claims, 6 Drawing Sheets

U.S. PATENT DOCUMENTS

| | | |
|---|---|---|
| 6,381,465 B1 | 4/2002 | Chern et al. |
| 6,393,407 B1 | 5/2002 | Middleton, III et al. |
| 6,405,243 B1 | 6/2002 | Nielsen |
| 6,408,309 B1 | 6/2002 | Agarwal |
| 6,446,261 B1 | 9/2002 | Rosser |
| 6,684,249 B1 | 1/2004 | Frerichs et al. |
| 6,690,394 B1 | 2/2004 | Harui |
| 6,698,020 B1 | 2/2004 | Zigmond et al. |
| 6,718,551 B1 | 4/2004 | Swix et al. |
| 6,886,000 B1 | 4/2005 | Aggarwal et al. |
| 6,920,326 B2 | 7/2005 | Agarwal et al. |
| 6,990,462 B1* | 1/2006 | Wilcox et al. ............. 705/14 |
| 7,039,599 B2 | 5/2006 | Merriman et al. |
| 7,072,947 B1 | 7/2006 | Knox et al. |
| 7,149,537 B1 | 12/2006 | Kupsh et al. |
| 7,203,684 B2 | 4/2007 | Carobus et al. |
| 7,280,818 B2 | 10/2007 | Clayton |
| 7,370,002 B2 | 5/2008 | Heckerman et al. |
| 7,558,559 B2 | 7/2009 | Alston |
| 7,685,019 B2 | 3/2010 | Collins |
| 7,730,017 B2 | 6/2010 | Nance et al. |
| 7,734,632 B2 | 6/2010 | Wang |
| 2001/0044739 A1 | 11/2001 | Bensemana |
| 2001/0047272 A1 | 11/2001 | Frietas et al. |
| 2001/0051925 A1 | 12/2001 | Kang |
| 2002/0006803 A1 | 1/2002 | Mendiola et al. |
| 2002/0016736 A1 | 2/2002 | Cannon et al. |
| 2002/0019829 A1 | 2/2002 | Shapiro |
| 2002/0052781 A1 | 5/2002 | Aufricht et al. |
| 2002/0075305 A1 | 6/2002 | Beaton et al. |
| 2002/0077130 A1 | 6/2002 | Owensby |
| 2002/0078147 A1 | 6/2002 | Bouthors et al. |
| 2002/0083411 A1 | 6/2002 | Bouthors et al. |
| 2002/0099842 A1 | 7/2002 | Jennings et al. |
| 2002/0137507 A1 | 9/2002 | Winkler |
| 2002/0138291 A1 | 9/2002 | Vaidyanathan et al. |
| 2002/0161770 A1 | 10/2002 | Shapiro et al. |
| 2002/0164977 A1* | 11/2002 | Link II et al. ............ 455/414 |
| 2002/0165773 A1 | 11/2002 | Natsuno et al. |
| 2002/0175935 A1 | 11/2002 | Wang et al. |
| 2003/0003935 A1 | 1/2003 | Vesikivi et al. |
| 2003/0023489 A1 | 1/2003 | McGuire et al. |
| 2003/0040297 A1 | 2/2003 | Pecen et al. |
| 2003/0083931 A1 | 5/2003 | Lang |
| 2003/0101454 A1* | 5/2003 | Ozer et al. ............... 725/42 |
| 2003/0126015 A1 | 7/2003 | Chan et al. |
| 2003/0154300 A1 | 8/2003 | Mostafa |
| 2003/0182567 A1 | 9/2003 | Barton et al. |
| 2003/0188017 A1 | 10/2003 | Nomura |
| 2003/0191689 A1 | 10/2003 | Bosarge et al. |
| 2003/0197719 A1 | 10/2003 | Lincke et al. |
| 2004/0003398 A1 | 1/2004 | Donian et al. |
| 2004/0043777 A1 | 3/2004 | Brouwer et al. |
| 2004/0045029 A1 | 3/2004 | Matsuura |
| 2004/0054576 A1 | 3/2004 | Kanerva et al. |
| 2004/0068435 A1 | 4/2004 | Braunzell |
| 2004/0133480 A1 | 7/2004 | Domes |
| 2004/0136358 A1 | 7/2004 | Hind et al. |
| 2004/0158858 A1 | 8/2004 | Paxton et al. |
| 2004/0185883 A1 | 9/2004 | Rukman |
| 2004/0192359 A1 | 9/2004 | McRaild et al. |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0209649 A1 | 10/2004 | Lord |
| 2004/0259526 A1 | 12/2004 | Goris et al. |
| 2005/0010641 A1 | 1/2005 | Staack |
| 2005/0021397 A1 | 1/2005 | Cui et al. |
| 2005/0060425 A1 | 3/2005 | Yeh et al. |
| 2005/0125397 A1 | 6/2005 | Gross et al. |
| 2005/0138140 A1 | 6/2005 | Wen et al. |
| 2005/0228680 A1 | 10/2005 | Malik |
| 2005/0228797 A1* | 10/2005 | Koningstein et al. ........ 707/100 |
| 2005/0239495 A1 | 10/2005 | Bayne |
| 2005/0239504 A1 | 10/2005 | Ishii et al. |
| 2005/0249216 A1 | 11/2005 | Jones |
| 2005/0273465 A1 | 12/2005 | Kimura |
| 2005/0273833 A1 | 12/2005 | Soinio |
| 2005/0289113 A1 | 12/2005 | Bookstaff |
| 2006/0031327 A1 | 2/2006 | Kredo |
| 2006/0040642 A1 | 2/2006 | Boris et al. |
| 2006/0048059 A1 | 3/2006 | Etkin |
| 2006/0059133 A1 | 3/2006 | Moritani |
| 2006/0068845 A1 | 3/2006 | Muller et al. |
| 2006/0075425 A1 | 4/2006 | Koch et al. |
| 2006/0095511 A1 | 5/2006 | Munarriz et al. |
| 2006/0117378 A1 | 6/2006 | Tam et al. |
| 2006/0123014 A1 | 6/2006 | Ng |
| 2006/0129455 A1 | 6/2006 | Shah |
| 2006/0141923 A1 | 6/2006 | Goss |
| 2006/0161520 A1 | 7/2006 | Brewer et al. |
| 2006/0168616 A1 | 7/2006 | Candelore |
| 2006/0194595 A1 | 8/2006 | Myllynen et al. |
| 2006/0200460 A1 | 9/2006 | Meyerzon et al. |
| 2006/0200461 A1 | 9/2006 | Lucas et al. |
| 2006/0206586 A1 | 9/2006 | Ling et al. |
| 2006/0276170 A1 | 12/2006 | Radhakrishnan et al. |
| 2006/0276213 A1 | 12/2006 | Gottschalk et al. |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288124 A1 | 12/2006 | Kraft et al. |
| 2007/0004333 A1 | 1/2007 | Kavanti |
| 2007/0011344 A1 | 1/2007 | Paka et al. |
| 2007/0027760 A1 | 2/2007 | Collins et al. |
| 2007/0027762 A1 | 2/2007 | Collins et al. |
| 2007/0037562 A1 | 2/2007 | Smith-Kerker et al. |
| 2007/0047523 A1 | 3/2007 | Jiang |
| 2007/0061195 A1 | 3/2007 | Liu et al. |
| 2007/0061300 A1 | 3/2007 | Ramer et al. |
| 2007/0072631 A1 | 3/2007 | Mock et al. |
| 2007/0074262 A1 | 3/2007 | Kikkoji et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0094066 A1 | 4/2007 | Kumar et al. |
| 2007/0100651 A1 | 5/2007 | Ramer et al. |
| 2007/0100805 A1 | 5/2007 | Ramer et al. |
| 2007/0105536 A1* | 5/2007 | Tingo, Jr. ............. 455/414.1 |
| 2007/0113243 A1 | 5/2007 | Brey |
| 2007/0117571 A1 | 5/2007 | Musial |
| 2007/0118592 A1 | 5/2007 | Bachenberg |
| 2007/0136457 A1 | 6/2007 | Dai et al. |
| 2007/0149208 A1 | 6/2007 | Syrbe et al. |
| 2007/0180147 A1 | 8/2007 | Leigh |
| 2007/0192409 A1 | 8/2007 | Kleinstern et al. |
| 2007/0198485 A1 | 8/2007 | Ramer et al. |
| 2007/0214470 A1 | 9/2007 | Glasgow et al. |
| 2007/0260624 A1 | 11/2007 | Chung et al. |
| 2007/0288950 A1 | 12/2007 | Downey et al. |
| 2007/0290787 A1 | 12/2007 | Fiatal et al. |
| 2008/0004046 A1 | 1/2008 | Mumick et al. |
| 2008/0013537 A1 | 1/2008 | Dewey et al. |
| 2008/0032703 A1 | 2/2008 | Krumm et al. |
| 2008/0032717 A1 | 2/2008 | Sawada et al. |
| 2008/0065491 A1 | 3/2008 | Bakman |
| 2008/0070579 A1 | 3/2008 | Kankar et al. |
| 2008/0071875 A1 | 3/2008 | Koff et al. |
| 2008/0071929 A1 | 3/2008 | Motte et al. |
| 2008/0082686 A1 | 4/2008 | Schmidt et al. |
| 2008/0091796 A1 | 4/2008 | Story |
| 2008/0140508 A1 | 6/2008 | Anand et al. |
| 2008/0228568 A1 | 9/2008 | Williams et al. |
| 2008/0243619 A1 | 10/2008 | Sharman et al. |
| 2008/0249832 A1 | 10/2008 | Richardson et al. |
| 2008/0271068 A1 | 10/2008 | Ou et al. |
| 2008/0281606 A1 | 11/2008 | Kitts et al. |
| 2008/0288476 A1 | 11/2008 | Kim et al. |
| 2008/0319836 A1 | 12/2008 | Aaltonen et al. |
| 2009/0006194 A1 | 1/2009 | Sridharan et al. |
| 2009/0029721 A1 | 1/2009 | Doraswamy |
| 2009/0049090 A1 | 2/2009 | Shenfield et al. |
| 2009/0063249 A1 | 3/2009 | Tomlin et al. |
| 2009/0106111 A1 | 4/2009 | Walk et al. |
| 2009/0125377 A1 | 5/2009 | Somji et al. |
| 2009/0132395 A1 | 5/2009 | Lam et al. |

| | | | |
|---|---|---|---|
| 2009/0197619 A1 | 8/2009 | Colligan et al. | |
| 2009/0216847 A1 | 8/2009 | Krishnaswamy et al. | |
| 2009/0275315 A1 | 11/2009 | Alston | |
| 2009/0286520 A1 | 11/2009 | Nielsen et al. | |
| 2009/0298483 A1 | 12/2009 | Bratu et al. | |
| 2010/0082397 A1 | 4/2010 | Blegen | |
| 2010/0082423 A1 | 4/2010 | Nag et al. | |
| 2010/0088152 A1 | 4/2010 | Bennett | |
| 2010/0114654 A1 | 5/2010 | Lukose et al. | |
| 2010/0125505 A1 | 5/2010 | Puttaswamy | |
| 2010/0138271 A1 | 6/2010 | Henkin et al. | |
| 2010/0161424 A1 | 6/2010 | Sylvain | |
| 2010/0169157 A1 | 7/2010 | Muhonen et al. | |
| 2010/0169176 A1 | 7/2010 | Turakhia | |

FOREIGN PATENT DOCUMENTS

| | | |
|---|---|---|
| DE | 19941461 | 3/2001 |
| DE | 10061984 | 6/2002 |
| EP | 1061465 | 12/2000 |
| EP | 1073293 | 1/2001 |
| EP | 1107137 | 6/2001 |
| EP | 1109371 | 6/2001 |
| EP | 1220132 | 7/2002 |
| EP | 1239392 | 9/2002 |
| EP | 2372867 | 9/2002 |
| EP | 1 280 087 A1 | 1/2003 |
| EP | 1365604 | 11/2003 |
| EP | 1408705 | 4/2004 |
| EP | 1455511 | 9/2004 |
| EP | 1509024 | 2/2005 |
| EP | 1 528 827 A2 | 5/2005 |
| EP | 1542482 | 6/2005 |
| EP | 1587332 | 10/2005 |
| EP | 1615455 | 1/2006 |
| EP | 1633100 | 3/2006 |
| EP | 1677475 | 7/2006 |
| EP | 1 772 822 A1 | 4/2007 |
| GB | 2343051 | 4/2000 |
| GB | 2369218 | 5/2002 |
| GB | 2 372 867 A | 9/2002 |
| GB | 2406996 | 4/2005 |
| GB | 2414621 | 11/2005 |
| GB | 2424546 | 9/2006 |
| JP | 2002-140272 | 5/2002 |
| JP | 2007/087138 | 4/2007 |
| JP | 2007/199821 | 8/2007 |
| KR | 20060011760 | 7/2004 |
| WO | 96/24213 | 8/1996 |
| WO | 98/21713 | 5/1998 |
| WO | 00/00916 | 1/2000 |
| WO | 00/30002 | 5/2000 |
| WO | 00/44151 | 7/2000 |
| WO | 02/09431 | 1/2001 |
| WO | 01/22748 | 3/2001 |
| WO | 01/31497 | 5/2001 |
| WO | WO 01/44977 A2 | 6/2001 |
| WO | 01/52161 | 7/2001 |
| WO | 01/57705 | 8/2001 |
| WO | 01/58178 | 8/2001 |
| WO | WO 01/63423 A1 | 8/2001 |
| WO | 01/65411 | 9/2001 |
| WO | 01/69406 | 9/2001 |
| WO | 01/71949 | 9/2001 |
| WO | WO01/72063 | 9/2001 |
| WO | 2004/086791 | 10/2001 |
| WO | 01/91400 | 11/2001 |
| WO | 01/93551 | 12/2001 |
| WO | 01/97539 | 12/2001 |
| WO | 2004/104867 | 12/2001 |
| WO | 02/31624 | 4/2002 |
| WO | WO 02/44989 A2 | 6/2002 |
| WO | 02/054803 | 7/2002 |
| WO | 02/069585 | 9/2002 |
| WO | 02/069651 | 9/2002 |
| WO | WO02/075574 | 9/2002 |
| WO | 02/084895 | 10/2002 |
| WO | 02/086664 | 10/2002 |
| WO | WO 02/096056 A2 | 11/2002 |
| WO | 03/015430 | 2/2003 |
| WO | 03/019845 | 3/2003 |
| WO | 03/024136 | 3/2003 |
| WO | 03/049461 | 6/2003 |
| WO | 03/088690 | 10/2003 |
| WO | 2004/084532 | 9/2004 |
| WO | 2004/100470 | 11/2004 |
| WO | 2004/100521 | 11/2004 |
| WO | 2004/102993 | 11/2004 |
| WO | WO2004/100470 | 11/2004 |
| WO | WO 2004/100470 A1 | 11/2004 |
| WO | 2005/020578 | 3/2005 |
| WO | 2005/029769 | 3/2005 |
| WO | 2005/076650 | 8/2005 |
| WO | WO 2005/073863 A1 | 8/2005 |
| WO | 2006/002869 | 1/2006 |
| WO | 2006/005001 | 1/2006 |
| WO | 2006/016189 | 2/2006 |
| WO | 2006/027407 | 3/2006 |
| WO | WO 2006/024003 A1 | 3/2006 |
| WO | WO2006/040749 | 4/2006 |
| WO | 2006/093284 | 9/2006 |
| WO | 2006/119481 | 11/2006 |
| WO | 2007/001118 | 1/2007 |
| WO | WO 2007/002025 A2 | 1/2007 |
| WO | WO 2007/060451 A2 | 5/2007 |
| WO | WO 2007/091089 A1 | 8/2007 |
| WO | 2007/103263 | 9/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/009507 | 1/2009 |
| WO | 2009/032856 | 3/2009 |
| WO | 2009/061914 | 5/2009 |
| WO | 2009/077888 | 6/2009 |
| WO | 2009/099876 | 8/2009 |
| WO | 2009/158097 | 12/2009 |

OTHER PUBLICATIONS

U.K. Search Report under Section 17 dated Oct. 23, 2007, in U.K. Application Serial No. 0712280.07.
Communication (European Search Report) dated Jun. 26, 2008 in European Patent Application No. EP 08 10 1394.
XP002456252—Statement in Accordance with the Notice from the European Patent Office dated Oct. 1, 2007 concerning business methods (OJ Nov. 2007; p. 592-593).
Communication Pursuant to Article 94(3) EPC (European Examination Report) dated Oct. 23, 2008 issued in counterpart European Patent Application No. EP 08 101 394.8-1238.
Communication (Notification Concerning Transmittal of International Preliminary Report on Patentability, International Preliminary Report on Patentability and Written Opinion of the International Searching Authority) issued in connection with related International Application PCT/EP2008/051489 and mailed Sep. 24, 2009 (6 pages).
"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.
"Combined Search and Examination Report", for United Kingdom Patent Application No. GB 0816228.1 dated Jan. 2009, Jan. 6, 2009.
"Combined Search and Examination Report dated Mar. 7, 2008", for United Kingdom Patent Application No. GB 0721863.9, Mar. 7, 2008.
"Communication (Combined Search and Examination Report under Sections 17 and 18(3)) dated Jan. 30, 2009 issued from the United Kingdom Patent Office", in related United Kingdom Application No. GB 0818145.5 (8 pages), Jan. 30, 2009.
"Communication (European Search Report) dated Oct. 17, 2008 issued by the European Patent Office", in counterpart European Patent Application EP 08156763, Oct. 17, 2008.
"Communication (International Search Report along with Written Opinion of International Searching Authority) mailed Oct. 8, 2008 issued by the International Searching Authority", in counterpart International Application PCT/EP 2008/056342, Oct. 8, 2008.

"Communication (Search Report under Section 17 along with Examination Report under Section 18(3)) dated Oct. 6, 2008 issued by the United Kingdom Intellectual Property Office", in counterpart U.K. Application GB 0809321.3, Oct. 6, 2008.

"Examination Report", for counterpart European Patent Application No. 08153257.4 issued Jun. 2, 2009.

"Examination Report dated Nov. 9, 2009", for European Patent Application No. EP 08159355.0, Sep. 11, 2009.

"Examination Report dated Jun. 17, 2009", issued in counterpart U.K. Application No. GB 0803273.2 by U.K. Intellectual Property Office (4 pages).

"International Preliminary Report on Patentability issued Nov. 24, 2009", in International Application PCT/EP 2008/056342 (1 page), Nov. 24, 2009.

"International Search Report", for International Application No. PCT/FI 2006/050455, dated Jul. 25, 2007.

"International Search Report and Written Opinion mailed on Aug. 26, 2011", for PCT/US 2011/034927 titled "Content Delivery Based on User Terminal Events," to Apple Inc., Aug. 26, 2011.

"International Search Report and Written Opinion of the International Search Authority mailed Jun. 19, 2009", for International Application No. PCT/EP 2008/056069, Jun. 19, 2009.

"International Search Report and Written Opinion of the International Searching Authority mailed Feb. 11, 2009, issued by the International Searching Authority", in related International Application PCT/EP 2008/063839 (11 pages).

"International Search Report mailed Mar. 24, 2009", in related PCT International Application No. PCT/EP 2008/063326 (4 pages), Mar. 24, 2009.

"Notification of Transmittal of the International Search Report and the Written Opinion of the International Searching Authority mailed Mar. 24, 2009", in related PCT International Application No. PCT/EP 2008/063326 (1 page), Mar. 24, 2009.

"Office Action dated Mar. 31, 2011 issue by the U.S. Patent Office", in related U.S. Appl. No. 12/080,124 (29 pages), Mar. 31, 2011.

"Office Action issued from the USPTO dated Aug. 20, 2009", issued in related U.S. Appl. No. 12/075,593 (14 pages), Aug. 20, 2009.

"Office Action issued Mar. 17, 2010", in related U.S. Appl. No. 12/075,593 (11 pages), Mar. 17, 2010.

"Office Action Issued Oct. 15, 2010 by the U.S. Patent Office", in related U.S. Appl. No. 12/080,124 (28 pages), Oct. 15, 2010.

"Search Report under Section 17 dated Jul. 7, 2008", in related U.K. Application GB 0803273.2.

"Written Opinion of the International Searching Authority issued Nov. 24, 2009", in International Application PCT/EP 2008/056342 (6 pages), Nov. 24, 2009.

"Written Opinion of the International Searching Authority mailed Mar. 24, 2009 issued from the International Searching Authority", in related PCT International Application No. PCT/EP 2008/063326 (5 pages), Mar. 24, 2009.

Hillard, Dustin et al., "Improving Ad Relevance in Sponsored Search", Proceedings of the third ACM international conference on Web search and data mining, WSDM'10, Feb. 4-6, 2010, SESSION: Ads, pp. 361-369, ACM, New York, New York, USA, 2010., Feb. 4, 2010, 361-369.

Internet Reference, "Specific Media Behavioral Targeting Index", Specific Media, Inc., Irvine, CA, 2010, Available online at http://www.specificmedia.com/behavioral-targeting.php.

Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.

Mueller, Milton, "Telecommunication Access in Age of Electronic Commerce: Toward a Third-Generation Service Policy", Nov. 1996, HeinOnline, 49. Fed. Comm L.J., Nov. 1, 1996, 655-665.

Regelson, Moira et al., "Predicting Click-Through Rate Using Keyword Clusters", Proceedings of the Second Workshop on Sponsored Search Auctions, EC'06, SSA2, Jun. 11, 2006, ACM, 2006., Jun. 11, 2006.

Richardson, Matthew et al., "Predicting Clicks: Estimating the Click-Through Rate for New Ads", Proceedings of the 16th international conference on World Wide Web, Banff, Alberta, Canada, May 8-12, 2007, SESSION: Advertisements & click estimates, pp. 521-529, ACM, 2007., May 8, 2007, 521-529.

Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.

* cited by examiner

| Campaign management | Logged in SoftDrink1 LTD |

| Campaign | Profile | Pricing | Schedule |

SoftDrink1 is good.

---

| Campaign management | Logged in SoftDrink1 LTD |

| Campaign | Profile | Pricing | Schedule |

Male/Female
Age
State
City
Interests

Total target size 12M
Segmented target size 100k

---

| Campaign management | Logged in SoftDrink1 LTD |

| Campaign | Profile | Pricing | Schedule |

| Size of campaign | 40k | |
|---|---|---|
| Tier 1 | $0.2 | 0 | $0 |
| Tier 2 | $0.1 | 0 | $0 |
| Tier 3 | $0.05 | 40k | $2000 |
| | | Total | $2000 |

---

| Campaign management | Logged in SoftDrink1 LTD |

| Campaign | Profile | Pricing | Schedule |

Start date

End date

AM/PM

Days

Available target size 12M
Available segmented size 100k

Panel 1:
Campaign management — Logged in SoftDrink1 LTD
Tabs: Campaign | Profile | Pricing | Schedule
SoftDrink1 is good.

Panel 2:
Campaign management — Logged in SoftDrink1 LTD
Tabs: Campaign | Profile | Pricing | Schedule
- Male/Female
- Age
- State
- City
- Interests Total target size 12M
Segmented target size 100k

Panel 3:
Campaign management — Logged in SoftDrink1 LTD
Tabs: Campaign | Profile | Pricing | Schedule

| Size of campaign | 40k | | |
|---|---|---|---|
| Tier 1 | $0.2 | 0 | $0 |
| Tier 2 | $0.1 | 0 | $0 |
| Tier 3 | $0.05 | 40k | $2000 |
| | | Total | $2000 |

Panel 4:
Campaign management — Logged in SoftDrink1 LTD
Tabs: Campaign | Profile | Pricing | Schedule
- Start date
- End date
- AM/PM
- Days Available target size 12M
Available segmented size 100k

| Campaign management | Logged in SoftDrink2 LTD |
|---|---|

| Campaign | Profile | Pricing | Schedule |
|---|---|---|---|

SoftDrink2 is it.

---

| Campaign management | Logged in SoftDrink2 LTD |
|---|---|

| Campaign | Profile | Pricing | Schedule |
|---|---|---|---|

Male/Female
Age
State
City
Interests

Total target size 12M
Segmented target size 100k

---

| Campaign management | Logged in SoftDrink2 LTD |
|---|---|

| Campaign | Profile | Pricing | Schedule |
|---|---|---|---|

| Size of campaign | 30k | |
|---|---|---|
| Tier 1 | $0.2 | 0 | $0 |
| Tier 2 | $0.1 | 20k | $2000 |
| Tier 3 | $0.05 | 10k | $500 |
| | Total | $2500 |

---

| Campaign management | Logged in SoftDrink2 LTD |
|---|---|

| Campaign | Profile | Pricing | Schedule |
|---|---|---|---|

Start date

End date

AM/PM

Days

Available target size 12M
Available segmented size 60k

*FIG. 3 CONT'D*

| Campaign management | Logged in SoftDrink3 LTD |
|---|---|
| Campaign | Profile | Pricing | Schedule |

SoftDrink3 is best.

---

| Campaign management | Logged in SoftDrink3 LTD |
|---|---|
| Campaign | Profile | Pricing | Schedule |

Male/Female
Age
State
City
Interests

Total target size 12M
Segmented target size 100k

---

| Campaign management | Logged in SoftDrink3 LTD |
|---|---|
| Campaign | Profile | Pricing | Schedule |

| Size of campaign | 15k | |
|---|---|---|
| Tier 1 | $0.2 | 5k | $1000 |
| Tier 2 | $0.1 | 10k | $1000 |
| Tier 3 | $0.05 | 0 | $0 |
| | | Total | $2000 |

---

| Campaign management | Logged in SoftDrink3 LTD |
|---|---|
| Campaign | Profile | Pricing | Schedule |

Start date

End date

AM/PM

Days

Available target size 12M
Available segmented size 30k

*FIG. 3 CONT'D*

| Campaign management | | | Logged in SoftDrink1 LTD |
|---|---|---|---|
| Campaign | Profile | Pricing | Schedule |
| Budget of campaign | | $3000 | |
| Tier 1 | $0.2 | $0 | 0 |
| Tier 2 | $0.1 | $500 | 5000 |
| Tier 3 | $0.05 | $2500 | 50 000 |
| | | Total | 55 000 |

| Campaign management | | | Logged in SoftDrink2 LTD |
|---|---|---|---|
| Campaign | Profile | Pricing | Schedule |
| Budget of campaign | | $3000 | |
| Tier 1 | $0.2 | $500 | 1000 |
| Tier 2 | $0.1 | $2500 | 25 000 |
| Tier 3 | $0.05 | $0 | 0 |
| | | Total | 26 000 |

| Campaign management | | | Logged in SoftDrink3 LTD |
|---|---|---|---|
| Campaign | Profile | Pricing | Schedule |
| Budget of campaign | | $2000 | |
| Tier 1 | $0.2 | $3000 | 15 000 |
| Tier 2 | $0.1 | $0 | 0 |
| Tier 3 | $0.05 | $0 | 0 |
| | | Total | 15 000 |

FIG. 4

ADVERTISING MANAGEMENT SYSTEM AND METHOD WITH DYNAMIC PRICING

CROSS-REFERENCE TO RELATED APPLICATIONS

This application claims the benefit of the filing date of U.S. Provisional Patent Application Ser. No. 60/906,366 filed Mar. 12, 2007 and United Kingdom Application No. GB0712280.7 filed Jun. 22, 2007, the disclosures of which are incorporated herein in their entireties.

FIELD OF INVENTION

The present invention relates generally to a system and method for managing delivery of advertisements to consumers and more particularly to a system and method for managing delivery of various types of advertisements to consumers' telecommunications devices.

BACKGROUND OF THE INVENTION

Currently, it is possible for consumers to receive mobile telecommunications services at below market prices in exchange for receiving and interacting with advertisements directed to the consumers' mobile telecommunications devices. Even more so, there are business models and operators in the global market offering such mobile telecommunications services free of charge when a consumer elects to receive and possibly interact with paid advertisements. This is often referred to as mobile marketing.

Mobile marketing is considered by advertisers as the next new channel to directly reach consumers since it utilizes core assets and characteristics of the mobile media. Specifically, it is personal in that it is directed solely to individual consumers, it is "always on", can reach the consumers whenever they access their communications devices and wherever they are, and it is mobile. Moreover, mobile marketing often results in the formation of groups of people who communicate actively with each other. It is now envisioned that these characteristics combined with social network-based approaches of the Internet could form a very powerful base to execute marketing and advertising strategies.

In a typical mobile marketing or advertising arrangement, there is a set of consumers with certain profiles. These are target consumers for the advertisements, forming a target audience or target profile group. In a typical business arrangement, an advertiser selects the target audience to which the advertisement is to be delivered using a web-based tool or interface (with preferred profiles). The mobile marketing messages or advertisements are delivered to consumers in the target profile group using one or more mobile communication networks.

SUMMARY OF THE INVENTION

A first embodiment of a method for delivering advertisements, for example to consumers, in accordance with the invention includes defining a plurality of tiers of available advertisements, each tier containing a number of advertisements, setting a price for allocation of an advertisement in each tier wherein a lowest tier has the lowest price and the price increases to a maximum at a highest tier, and allocating advertisements to advertisers based on availability starting from a lowest tier with unallocated advertisements and progressing to higher tiers.

The consumers can be segmented or partitioned into a plurality of target profile groups with a set of tiers being defined for each of the target profile groups. The prices for allocation of advertisements in the tiers for each target profile group are ideally set independent of one another. The prices may be set according to supply and demand of advertisements for each target profile group.

Formation of the tiers and number of allocated advertisements for each tier may be obtained by first determining the total number of available advertisements, possibly in consideration of the number of advertisements permitted to be delivered to each consumer in a given period of time, the total number of consumers and a predetermined time period. Then, a percentage of advertisement inventory is assigned to each tier, and the number of advertisements in each tier is obtained by multiplying the percentage by the total amount of available advertisements.

In one embodiment, the allocation of advertisements to advertisers is enabled via an interface available to the advertisers. The interface enables each advertiser to, among other things, enter one or more advertisements to be delivered to the consumers' telecommunications devices, select the manner of delivery, select a target profile group of consumers to receive advertisements, select one or more parameters relating to the time of delivery of advertisements, and determine whether the advertiser wants to conduct their advertising campaign based on delivery of a set number of advertisements or a total amount of money, i.e., a budget-based advertising campaign. When an advertiser elects to perform an advertising campaign based on delivery of a set number of advertisements, each advertiser is allocated available advertisements from a lowest one of the tiers having unallocated advertisements, and then the cost of the advertisements is provided to the advertiser. When an advertiser elects to perform a budget-based advertising campaign, each advertiser is allocated available advertisements from a lowest one of the tiers having unallocated advertisements until the cost of the advertisements equals the budget, and then the number of allocated advertisements is provided to the advertiser.

A method for delivering advertisements to consumers in accordance with an exemplary embodiment of the invention includes determining a total number of available advertisements for a set period of time that can be delivered to the consumers' telecommunications devices, defining a plurality of tiers of available advertisements, each tier containing a portion of the total number of advertisements, setting a price for allocation of an advertisement in each tier wherein a lowest tier has the lowest price and the price increases to a maximum at a highest tier, enabling advertisers to obtain an allocation of advertisements based on availability starting from a lowest tier with unallocated advertisements and progressing to higher tiers, and managing the reception of advertisements from the advertisers and the delivery of the received advertisements to the consumers' telecommunications devices in accordance with the allocations of the advertisers. The variations of the method described above can be applied to this method as well.

One exemplary embodiment of a system for enabling advertisers to deliver advertisements to consumers in accordance with the invention includes an advertising management system having a defined plurality of tiers of available advertisements, each containing a number of advertisements, and a set price for allocation of an advertisement in each tier wherein a lowest tier has the lowest price and the price increases to a maximum at a highest tier, and an interface to the advertising management system accessible by advertisers to enable the advertisers to input advertisements to the advertising management system and obtain an allocation of advertisements based on availability starting from a lowest tier with unallocated advertisements and progressing to higher tiers.

In one embodiment, infrastructure is coupled to the advertising management system to enable delivery of advertisements from the advertisers entered via the interface in accordance with the allocation of such advertisements. The infrastructure may be capable of delivering the advertisements to the consumers' telecommunications devices.

In one embodiment, the consumers are partitioned into a plurality of target profile groups and a set of a plurality of tiers is defined for each target profile group. The set prices for the allocation of advertisements in the tiers for each target profile group are independent of one another and may be performed according to supply and demand of advertisements for each target profile group.

The advertising management system may be arranged to determine the total number of available advertisements in consideration of the number of advertisements permitted to be delivered to each consumer in a given period of time, the total number of consumers and a predetermined time period for the advertising campaign. A percentage of advertisement inventory is thereby assigned to each tier by an operator of the advertising management system, with the number of advertisements in each tier being determined by multiplying the percentage by the total amount of available advertisements.

The interface may be a user-friendly interface designed to enable each advertiser to create their own advertising campaign. The interface enables the advertisers to, among other things, select a target profile group of consumers to receive advertisements, select one or more parameters relating to the time of delivery of advertisements, and perform either an advertising campaign based on a total amount of money to be spent or on delivery of a desired number of advertisements. When an advertiser elects to perform an advertising campaign based on delivery of a desired number of advertisements, the advertising management system is arranged to allocate to each advertiser, available advertisements from a lowest one of the tiers having unallocated advertisements, and then provide the cost of the advertisements to the advertiser via the interface. On the other hand, when an advertiser elects to perform an advertising campaign based on a total amount of money to be spent, the advertising management system is arranged to allocate to each advertiser, available advertisements from a lowest one of the tiers having unallocated advertisements until the cost of the advertisements equals the budget, and then provide the number of allocated advertisements to the advertiser via the interface.

Another exemplary embodiment of a system for delivering advertisements in accordance with the invention includes means for defining a plurality of tiers of available advertisements, each tier containing a number of advertisements, means for setting a price for allocation of an advertisement in each tier wherein a lowest tier has the lowest price and the price increases to a maximum at a highest tier, and means for allocating advertisements to advertisers based on availability starting from a lowest tier with unallocated advertisements and progressing to higher tiers. Additional features of this system are described above in connection with the description of methods and other systems in accordance with the invention. An exemplary system for enabling advertisers to create advertising campaigns in accordance with the invention includes advertising management means for managing a plurality of advertising campaigns, the advertising management means including a plurality of tiers of available advertisements, each containing a number of advertisements, and a set price for allocation of an advertisement in each tier wherein a lowest tier has the lowest price and the price increases to a maximum at a highest tier, and interface means for enabling advertisers to access the advertising management means and input advertisements thereto and obtain an allocation of advertisements based on availability starting from a lowest tier with unallocated advertisements and progressing to higher tiers. Additional features of this system are described above in connection with the description of methods and other systems in accordance with the invention.

An exemplary user interface for an advertising management system which enables advertisers to create advertising campaigns in accordance with the invention includes means for enabling the advertisers to input advertisements, means for enabling the advertisers to select a target profile group of consumers to receive advertisements, means for enabling the advertisers to select one or more parameters relating to the time of delivery of advertisements, and means for enabling the advertisers to create an advertising campaign based on a total amount of money or on delivery of a desired number of advertisements. Additional features of this user interface are described above in connection with the description of methods and systems in accordance with the invention.

An exemplary computer readable media for organizing delivery of advertisements in accordance with the invention is capable of defining a plurality of tiers of available advertisements, each tier containing a number of advertisements, setting a price for allocation of an advertisement in each tier wherein a lowest tier has the lowest price and the price increases to a maximum at a highest tier, and allocating advertisements to advertisers based on availability starting from a lowest tier with unallocated advertisements and progressing to higher tiers. This computer readable media is also capable of performing other functions as described in connection with the description of methods and systems in accordance with the invention.

An exemplary database for use in an advertising delivery system in accordance with the invention includes advertisements obtained from advertisers, scheduling information relating to when the advertisers want their advertisements delivered, profile information relating to target profile groups to whom the advertisers want their advertisements delivered, and pricing information relating to prices paid for delivering of advertisements. The database can also include other information, such as used in any of the methods and systems described above, for example, delivery information relating to the manner in which the advertisements are to be delivered.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 2 shows an example of screen shots of an Internet interface which can be used to define a advertising campaign in accordance with the invention.

FIG. 3 shows examples of screen shots for three different advertising campaigns in accordance with the invention.

FIG. 4 shows an example of a screen shot of a budget-based advertising campaign using the advertisement management system and method in accordance with the invention.

DETAILED DESCRIPTION OF THE INVENTION

Figure 1:
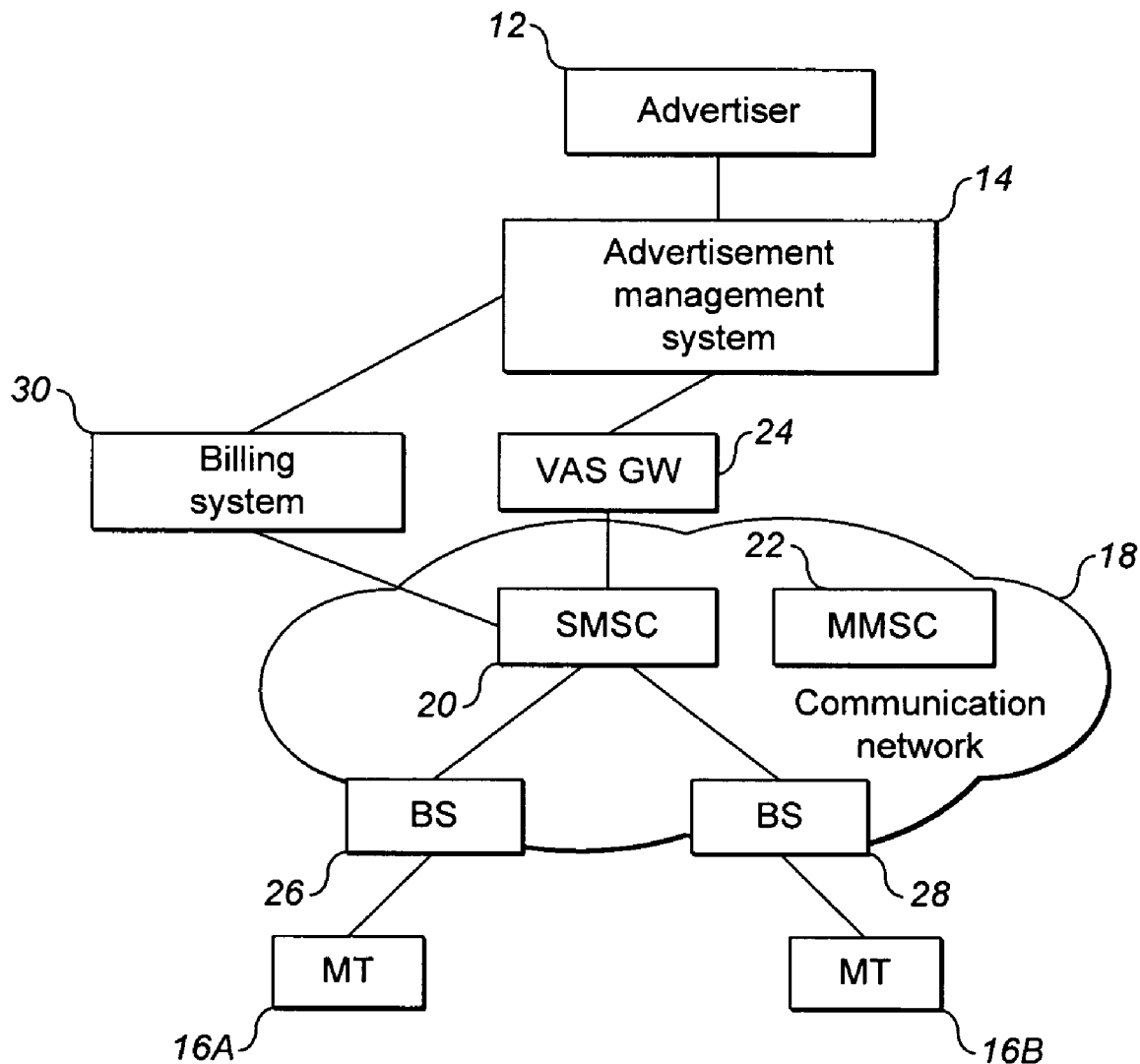
FIG. 1 is a schematic of an exemplifying architecture of an advertisement management system in accordance with the invention.

Referring to the accompanying drawings wherein the same reference numerals refer to the same or similar elements, FIG.

1 shows an architecture of an exemplary embodiment of a mobile marketing system in accordance with the invention which is designated generally as 10. The system 10 includes one or more advertisers 12, defined to include any and all entities or individuals that want to advertise products or services to customers participating in the mobile marketing arrangement, and an advertisement management system 14 that is operated by, for example, an advertising delivery company. Typically, the operator of the advertisement management system 14 is a company in the business of delivering advertisements from several advertisers, i.e., it is the intermediary between advertisers and the operators of the advertisement distribution channels. Operation of the advertisement management system 14 is typically managed over an Internet-interface.

The management system 14 may include tools for an advertiser 12 to define parameters of their advertisement campaign, i.e., to enable them to tailor the advertisement campaign to their specific desires. Parameters which can be defined include the target audience and the demographics thereof, the cost per advertisement, the type of advertisement, the total amount of money to be spent on the advertising campaign, the total number of advertisements to be delivered during an advertising campaign, the sociological background of the target audience, age, sex, target phone type, income level etc. In addition to determining the parameters, each advertiser 12 typically provides one or more actual advertisements in any available form such as html-documents, links, text, pictures, audio, video, television content, videos, HTML, xHTML, WAP pages, web pages, etc., or any digital content compatible for reception and display by the target consumers' mobile communication device or terminal 16A, 16B.

In a typical cellular infrastructure 18, such as GSM, WCDMA and CDMA, there are several methods for delivering content to consumers with mobile terminals 16A, 16B. The methods can include, but are not limited to, short message service (SMS) delivered via SMSC 20 (Short message service center), multimedia message service (MMS) delivered via MMSC 22 (MMS center), instant messaging (IM), electronic mail, wireless application protocol gateway (WAP GW), and Internet access point (Internet AP). In addition, advertisements can be delivered over local area networks such as a Wireless Local Area Network (WLAN), BlueTooth (BT) or over other networks such as WiMax, broadcast networks such as DMB, DVB-H, ISDB-T or broadcasting over cellular networks using standards such as MBMS (Multicast Broadcast Multimedia Service), among others.

Typically, advertisements are delivered from the advertising management system 14 to the cellular infrastructure 18 and then from the cellular infrastructure 18 to the terminals 16A, 16B via elements such as a Value Added GateWay (VAS GW) 24, SMSC 20, Basestations 26, 28. The mobile terminals 16A, 16B can be cellular phones, Personal Digital Assistants (PDA), personal computers (PC), multimedia computers etc. The mobile marketing system 10 may include a billing system 30 which is normally used to invoice mobile customers for usage of communication services such as messaging, data connection, voice calls, video calls etc.

The pricing model for a mobile marketing system 10 in accordance with the invention depends on several factors. One factor is the total number of available inventory items, i.e., the total number of advertisements that can be delivered to the participating consumers (those consumers who have elected to receive advertisements in exchange for free or discounted telecommunications services) as well as possibly to other consumers who do not obtain any benefit from receiving the advertisements. The total number of available inventory items is determined by multiplying the total number of participating consumers (C) by the number of advertisements which can be sent to them (M) per defined advertising time period (dt) (M/dt). Multiplying this product by an allocated period of time to deliver the advertisements (t) results in the total number of advertisements TM that can be delivered in this allocated period of time. Thus:

$$TM = C \times M/dt \times t$$

For example, for 10,000 consumers who have agreed to receive a maximum of 4 advertisements per day, then for a seven-day advertising period, the total number of advertisements available to the system to allocate to one or more advertisers for delivery to these consumers is 280,000.

As the set of consumers (C) is segmented according to set profiles (such as gender, age, zip code, interest, etc.), the target group size is $N_i$, where i is the index corresponding to the profiled target group. A consumer may simultaneously be a member of a plurality of target groups, e.g., a female living in California, belongs at least to at least the following three groups: females (i=1); Californians (i=2); and females in California (i=3). As such, the total number of advertisements (maximum inventory per group) which can be sent to each profiled target group i is then:

$$TM_i = N_i \times M/dt \times t$$

In practice, there may be multiple, different parameters which can be set as profile information resulting in a very large number of combinations of target profile groups. For example, if there is 10 on/off criteria for the consumers, there would actually be $2^{10}$ different possible combinations of these criteria. There are at least two methods to defining target profile groups, either define all possible groups $TM_i$ where i=1 ... $2^{10}$ or alternatively, form groups "on the fly" as the advertiser defines profiles.

The inventory level of available advertisements for the target profile groups decreases as advertisements are sent during an allocated advertising period and as advertising campaigns are reserved if there are consumers which belong to two or more target profile groups.

For example, assuming there are three groups, a first group defined i=1 corresponding to the selection of females, a second group defined i=2 corresponding on the selection of people living in California, and a third group defined i=3 corresponding to females living in California. Further assuming that, for example, 50% of the customers are females and 20% of all target customers are living in California. When an advertiser wants to send $y_1$ advertisements to the third group i=3, the available inventory of advertisements for that target profile group will be reduced:

$$TM_3 = TM_3 - y_1$$

Since the first and second groups, i=1 and i=2, overlap with the third group, i=3, the allocation of advertisements for the third group, i=3, $TM_3$, inherently influences the inventory levels of the first and second groups, i=1 and i=2, as follows:

$$TM_1 = TM_1 - y_1$$

$$TM_2 = TM_2 - y_1$$

thereby reducing the inventory level of available advertisements for all female customers (the first group) whether they live in California or not and reducing the inventory level of available advertisements for people living in California (the second group) whether they are female or male.

Now, if a subsequent advertiser wants to obtain an allocation of $y_2$ advertisements for the second group, i=2, the available inventory after the allocation is:

$$TM_2 = TM_2 - y_2$$

that is the total of available advertisements in the initial inventory less $y_1 + y_2$. Since the group of people living in California (i=2) overlaps with the group of females living in California (i=3) and the group of females (i=1), the inventory levels of the first and third groups i=1 and i=3 are reduced as follows:

$$TM_1 = TM_1 - y_2 \times 0.5$$

$$TM_3 = TM_3 - y_2 \times 0.5$$

that is, the inventory level of available advertisements for the group of females (i=1) is reduced by the determined weight (50% in this case).

Furthermore, when another advertiser wants to send y3 advertisements to the first group, i=1, i.e., the target profile group of females, the inventory levels of available advertisements for the three groups will be adjusted as follows:

$$TM_1 = TM_1 - y3$$

$$TM_2 = TM_2 - y_3 \times 0.2$$

$$TM_3 = TM_3 - y_3 \times 0.2$$

(the reduction in available advertisements for the second and third groups being related to the weight, i.e., the 20% of customers living in California).

After the allocations for these three advertisers, the initial inventory levels are thus reduced as follows:
the first group, i=1, by $y_3 + y_2 \times 0.5 + y_1$
the second group, i=2, by $y_3 \times 0.2 + y_2 + y_1$; and
the third group, i=3, by $y_3 \times 0.2 + y_2 \times 0.5 + y_1$ The party operating the advertisement management system 14 (and in some instances the communication network as well), i.e., the party in the business of offering advertisement delivery services, creates an interface to the advertisement management system 14 which can be used to define at least the following:

M number of messages which can be sent during a set period of time, for example 1 day.

dt the time period, such as one day t the advertising period, for example 90 days.

Other operational parameters to enable use of the advertising management system 14 via the interface can also be defined including, for example, the number of tiers which are used in the organization of the management system 14, the base price for sending an advertisement to a participating consumer, inventory levels for each tier which affect increases in the base price for sending an advertisement, and the increase in the base price or actual price for each tier.

Use of different tiers in the advertisement management system 14, and the attendant allocation of available inventory of advertisements into the tiers, determines the price of the overall advertising campaign (when conducting an advertising campaign based on a set number of advertisements) and also determines the number of advertisements in the advertising campaign (when conducting a budget-based advertising campaign).

The number of tiers may be freely selected and in an example below, there are three tiers. However, there may be less than three tiers, such as two tiers, or more than three tiers, such as four tiers, five tiers, and up. The determination of how many tiers to provide in the advertisement management system 14 depends on several factors, with more tiers resulting in a wider range of prices for the advertisements and more ranges of inventory levels.

Referring now to Table 1 (below), an example of the partitioning of available inventory of a total number of advertisements of a target profile group, $TM_i$, is shown. The total number of advertisements that can be delivered to the target profile group is 100,000 and the number of tiers selected is three. The base price is selected to be $0.05 per advertisement and assigned to the lowest tier, tier 3. The price for tier 2 is selected to be $0.10 per advertisement, double the base price. The price for tier 3 is selected to be $0.20 per advertisement, four times the base price. The inventory fill level for tier 3 is selected to be 0-50% corresponding to a maximum number of available advertisements of 50,000 (50% of the total number of messages which is 100,000). The inventory fill level for tier 2 is selected to be 50-80% corresponding to a maximum number of available advertisements of 30,000 (30% of the total number of messages which is 100,000). The inventory fill level for tier 1 is selected to be 80-100% corresponding to a maximum number of available advertisements of 20,000 (20% of the total number of messages which is 100,000).

TABLE 1

| Tier | Price | Inventory fill level % | Number of available messages |
|---|---|---|---|
| 1 | $0.2/message (4 × base price) | 80%-100% | 20 000 |
| 2 | $0.1/message (2 × base price) | 50%-80% | 30 000 |
| 3 | $0.05/message (base price) | 0%-50% | 50 000 |

The advertisement management system 14 can automatically calculate for the system operator the potential revenue once the operational parameters are set. Thus, for the example of the advertising system having the operational parameters set forth in Table 1, the maximum potential revenue is $0.20×20,000+$0.10×30,000+$0.05×50,000=$9,500. Since the inventory fill level is a settable operational parameter, along with the base price and prices for each tier, the operator can freely select these parameters in order to manage supply and demand of the advertisement inventory, and maximize or optimize the potential revenue.

In one embodiment of the invention, it is envisioned that the operator of the advertisement management system 14 would define windows when tiers will be opened (available) for allocating the advertisements, i.e., for example, a block of available advertisements can be made available for a 90 day period every 90 days. As each period begins, the advertisers can start making requests for the available advertisements in the inventory. In this manner, there is advantage for advertisers who are the first to reserve use or obtain an allocation of available advertisements in contrast to advertisers who reserve use or obtain an allocation of available advertisements later as the supply-demand pricing generated with the innovative system will cause an increase in the price.

As mentioned above, there is an interface for an advertiser to access the advertisement management system 14 and build an advertising campaign by themselves without requiring involvement with the operator of the advertising management system 14. FIG. 2 shows an exemplifying interface for an advertiser designated "SoftDrink1 Ltd".

Initially, to access the advertising management system 14, the advertiser is preferably required to register and then log in via the secured web interface. The interface provides variable fields designed to be modified by the advertiser in accordance with whatever parameters they want for their advertising campaign.

Although the organization of the interface is exemplary only and not intended to limit the invention, four variable fields are shown as tabs, i.e., Campaign, Profile, Pricing and Schedule, all under the heading Campaign management and an indication of the logged-in status of the advertiser. Using the "Campaign" tab, actual campaign content can be provided to the advertising management system, i.e., uploaded via an internet connection. The example here is a text-based campaign slogan: "SoftDrink1 is good." As such, the campaign slogan can be delivered to participating consumers for example via SMS or MMS. Although not shown, the delivery techniques available to deliver advertisements entered in the campaign field are also parameters selectable by the advertiser using the interface.

Using the "Profile" tab, an advertiser is able select one or more target profile groups of preferred recipients of the advertisements. The actual, available profile groups can be predetermined by the operator of the advertising management system 14. Profile groups can be defined according to, for example but not limited to, age, gender, location including state or city, interests, etc. and combinations thereof, so that, for example, an advertiser can select as the recipients of their advertisements only females between the ages of 18 and 21. To enable profiling of the participating consumers, the consumers should preferably be required to provide data about themselves to enable formation of different profile groups.

An advertiser is not required to select one or more of the target profile groups, in which case, the advertisements will be directed to all participating consumers.

Once an advertiser selects its target profile group, the appropriate portion of the total number of participating consumers designated to potentially receive that advertiser's advertisements will be calculated along with the total number of advertisements that can be delivered to these consumers. For example, a target profile group selected by an advertiser may be calculated to contain 25,000 consumers each of whom has agreed to accept 4 advertisements per day so that a daily maximum inventory is 100,000 advertisements. Both the entire target size TM and the segmented target size, or the number of consumers having the selected target profile, $TM_i$, can be displayed when determining the target profile.

The "Schedule" tab of the interface can be used to select when the advertisements entered using the "Campaign" tab are to be delivered to selected target profile group(s), determined using the "Profile" tab. Selectable parameters for the schedule include a start date on which the advertisements will begin to be delivered to consumers in the target group, an end date by which all of the advertisements will already have been sent to the consumers in the target group, preferred days of the week to send the advertisements, and preferred time or times of the day to send the advertisements. Both the entire available target size, TM, and the segmented available target size, $TM_i$, can be displayed when determining the scheduling parameters.

The "Pricing" tab of the interface enables an advertiser to create an advertising campaign based either on the total number of advertisements to be sent to the target profile group or based upon the total cost of the advertising campaign. Both variations utilize the innovative tier-based pricing and advertisement-allocation structure described herein.

The "Pricing" tab shows the different tiers and prices for available advertisements in each tier. These prices can and often do vary as a function of the target profile group so that a highly popular target profile group has higher prices than a less popular target profile group.

An example is described below wherein three advertisers use the advertising management system 14 for advertising campaigns based on the delivery of desired numbers of advertisements.

As shown in FIG. 2, a first advertiser enters a number of the advertisements to be delivered in a given period of time, in this case 40,000, in an area or field designated for the size of the campaign. The price for delivery of these 40,000 advertisements depends on the number of available advertisements in the inventory, i.e., in each tier of the inventory. Since this advertiser is the first to schedule delivery of advertisements using the advertising management system 14, all 40,000 advertisements can be allocated to tier 3, the tier with the lowest price, since the desired number of advertisements (40,000) is less than the number of available advertisements in tier 3 (50,000). Tier 3 will still contain 10,000 available advertisements after the first advertiser is allocated its 40,000 desired advertisements. Since the price for each advertisement in tier 3 is $0.05, the cost of SoftDrink1 Ltd.'s advertising campaign is 40,000×$0.05=$2000.

The second advertiser, SoftDrink2 Ltd., and the third advertiser, Softdrink3 Ltd., are also desirous to advertise to the same target profile group as the first advertiser. FIG. 3 shows the reservation flow diagrams for all three advertisers. The first column showing the reservation flow diagrams for the first advertiser Softdrink1 Ltd., which are basically the same as those shown in FIG. 2, but are repeated for easy reference for the explanation of the flow diagrams for the second and third advertisers, Softdrink2, Ltd. and Softdrink3, Ltd., in the second and third columns, respectively Once SoftDrink1 Ltd. has reserved 40,000 advertisements of the initially available total inventory of 100,000, the remaining inventory for the target profile group includes only 60,000 possible advertisements. This is indicated to the next advertiser who accesses the advertising management system 14 and selects the same target profile group, i.e., Softdrink2, Ltd. (see the schedule diagram at the bottom of the second column in FIG. 3 wherein the available segmented size is shown as being 60K).

As noted above, the operator of the advertising management system has allocated only 50,000 advertisements to tier 3 and since the first advertiser has been allocated 40,000 advertisements, only 10,000 advertisements remain in tier 3 for allocation to other advertisers. The second advertiser, Softdrink2 Ltd., wants 30,000 advertisements (entered into the field "Size of campaign" under the "Pricing" tab) and therefore can be allocated 10,000 from tier 3 and the 20,000 from tier 2, since the total number of available advertisements in tier 2 is 30,000. Since the price for each advertisement in tier 3 is $0.05 and the price for each advertisement in tier 2 is $0.10, the cost of SoftDrink2 Ltd.'s advertising campaign is 10,000×$0.05+20,000×$0.10=$2,500.

Once SoftDrink1 Ltd. and Softdrink2 Ltd. have reserved 70,000 advertisements of the initially available total inventory of 100,000, the remaining inventory for the target profile group includes only 30,000 possible advertisements. This is indicated to the next advertiser to access the advertising management system 14 and select the same target profile group, i.e., Softdrink3, Ltd. (see the schedule diagram at the bottom of the third column in FIG. 3 wherein the available segmented size is shown as being 30K).

As noted above, the operator of the advertising management system has allocated 30,000 advertisements to tier 2 and since the second advertiser has already been allocated 20,000 advertisements from tier 2, only 10,000 advertisements remain in tier 2 for future allocation. The third advertiser, Softdrink3 Ltd., has requested 15,000 advertisements and therefore can be allocated 10,000 from tier 2 and the remaining 5,000 from tier 1. Since the price for each advertisement in tier 2 is $0.10 and the price for each advertisement in tier 1 is $0.20, the cost of SoftDrink3 Ltd.'s advertising campaign is 10,000×$0.10+5,000×$0.20=$2,000.

After all of these advertisers have entered their information relating to their advertising campaigns, tier 1 will still contain 15,000 available advertisements for allocation to other advertisers. It should be noted that some operational parameters of the advertising management system 14 do not have to be displayed to the advertisers. For example, it might not be desirous to display the composition of the inventory fill levels and number of available messages to the advertisers.

The interface of the advertising management system 14 also enables advertisers to create advertising campaigns based on a budget, in contrast to determining the number of advertisements as in the example explained above with reference to FIGS. 2 and 3. Aside from a difference in the pricing portion of the interface, the other portions of the interface, i.e., Campaign, Profile and Schedule, are used in the same manner as for numeric-based advertising campaigns. The difference is that instead of an indication of a field to allow for entry of the size of the campaign, the field allows for entry of the budget of the campaign.

FIG. 4 shows an example of the pricing portions of the interface for budget-based advertising campaigns using the advertising management system in accordance with the invention. Each advertiser has a budget of $3,000 for its campaign and the sequence of using the interface is the same as in the above example, i.e., first Softdrink1, Ltd., then Softdrink2, Ltd. and then Softdrink3, Ltd.

The first advertiser, Softdrink1, Ltd., enters the budgeted amount of $3,000 for its campaign and the interface automatically allocates the number of advertisements in each tier it can receive for that budget. Filling of the tiers begins from the lowest priced tier, in this case, tier 3, and proceeds upward to tier 1. For its budgeted amount of $3,000, the first advertiser is able to receive an allocation of 50,000 advertisements from tier 3, the entire tier 3 allocation, and an allocation of 5,000 advertisements from tier 2 (for a total of 55,000 advertisements). For its budgeted amount of $3,000, the second advertiser is able to receive an allocation of 25,000 advertisements from tier 2, the remaining allocation of advertisements in tier 2, and an allocation of 1,000 advertisements from tier 1 (for a total of 26,000 advertisements). For its budgeted amount of $3,000, the third advertiser is able to receive an allocation of 15,000 advertisements from tier 1. Tier 1 will still contain 5,000 available advertisements for allocation to other, later-reserving advertisers.

The interface described above is highly user-friendly since each advertiser can, at their own initiative, adjust the size of their campaign to obtain an acceptable cost, when a numeric-based advertising campaign is being created, or alternatively, can adjust the price of their campaign to obtain an acceptable number of advertisements, when a budget-based campaign is being created. The advertising system can automatically calculate the total price for different numbers of advertisements when creating a numeric-based advertising campaign and can also automatically calculate the number of advertisements that can be obtained for a fixed price when creating a budget-based advertising campaign. This allows the advertisers to independently, without assistance from the operator of the advertising management system 14, optimize their advertising campaigns.

Moreover, since pricing can be a factor of the selected target profile, the manner in which the advertisements are being delivered to the consumers and/or the schedule, the advertisers can freely change any of the target profile, delivery methods and schedule to obtain an optimum or acceptable advertising campaign, all using the computer interface. Assistance by the operator of the advertising management system 14 should not be required, or only minimal.

The foregoing invention therefore provides a new and improved mobile marketing arrangement and method wherein advertisers are able to direct their advertisements to consumers in one or more specific target profile groups, thereby performing segmentation, at fixed prices for delivery of such advertisements, i.e., without requiring a higher price for the selection of specific target profile groups. Thus, some embodiments of the mobile marketing arrangement and method have independent pricing for advertising to each of a plurality of different target profile groups. The pricing of each target profile group is performed according to supply and demand irrespective of the pricing for any other target profile group.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. A method for allocating messaging slots for use in delivering messages to participating recipients within a mobile communications network during an allocated time period, the method comprising:

partitioning recipients of the advertising messages into a plurality of target profile groups wherein each recipient is allocated to more than one target profile group;

determining a total number of available messaging slots for each target profile group, each messaging slot enabling the transmittal of one advertising message from an advertising management system to recipients as a SMS, MMS, or WAP message, by multiplying the total number of recipients in each target profile group by the number of messages permitted to be delivered to each participating recipient per an advertising time period, and by the allocated time period;

defining a plurality of tiers of available messaging slots for each of the target profile groups, each tier containing an available inventory of messaging slots and a cost for delivering a message associated with a respective tier, wherein a lowest cost per message tier has a highest available inventory and a highest cost per message tier has a lowest available inventory, each said tier having a priority for use in scheduling the delivery of the advertising messages;

receiving from an advertiser parameters defining targeted recipients and a number of messages to be delivered; and the advertising management system assigning messaging slots to transmit a message to specific recipients based on availability of messaging slots, the advertising management system initially assigning messaging slots from a lowest cost per message tier with unallocated messaging slots and then progressing to the next higher cost per message tier with available messaging slots to assign any of the number of messages to be delivered which were not assigned in the lowest cost per message tier due to all of the messaging slots in the lowest cost per message tier having been filled, and creating a transmitting schedule for messages to the allocated recipients, wherein the availability of the messaging slots in each other target profile group to which the specific recipient is allocated is decreased by a determined weight calculated based on the percentage of total recipients belonging to each target profile group.

2. The method of claim 1, wherein the assignment of messages is performed according to supply and demand of advertising messages for each target profile group.

3. The method of claim 2, further comprising assigning a percentage of a total message slot inventory to each tier, the available inventory of messaging slots in each tier being determined by multiplying the percentage by the total amount of available messaging slots.

4. The method of claim 3, wherein the allocation of messaging slots to information providers is enabled via an interface available to the information providers.

5. The method of claim 4, further comprising:
forming the interface to enable each information provider to at least one of:
enter a message to be delivered to recipients;
select a target profile group of recipients to receive messages;
select one or more parameters relating to the time of delivery of messages; and
perform either a message delivery campaign based on a budget or on delivery of a set number of messages.

6. The method of claim 5, wherein when an information provider elects to perform a message delivery campaign based on delivery of a set number of messages, further comprising:
allocating to each information provider, available messaging slots from a lowest cost per message tier having unallocated messaging slots, and then
providing the cost of utilizing the messaging slots to the information provider.

7. The method of claim 5, wherein when an information provider elects to perform a message delivery campaign based on a budget, further comprising:
allocating to each information provider, available messaging slots from a lowest cost per message tier having unallocated messaging slots until the cost of utilizing the messaging slots equals the budget, and then
providing the number of allocated messaging slots to the information provider.

8. The method of claim 2, wherein the allocation of messaging slots to information providers is enabled via an interface available to the information providers.

9. The method of claim 8, further comprising:
forming the interface to enable each information provider to at least one of:
enter a message to be delivered to recipients;
select a target profile group of recipients to receive messages;
select one or more parameters relating to the time of delivery of messages; and
perform either a message delivery campaign based on a budget or on delivery of a set number of messages.

10. The method of claim 9, wherein when an information provider elects to perform a message delivery campaign based on delivery of a set number of messages, further comprising:
allocating to each information provider, available messaging slots from a lowest cost per message tier having unallocated messaging slots, and then
providing the cost of utilizing the messaging slots to the information provider.

11. The method of claim 9, wherein when an information provider elects to perform a message delivery campaign based on a budget, further comprising:
allocating to each information provider, available messaging slots from a lowest cost per message tier having unallocated messaging slots until the cost of utilizing the messaging slots equals the budget, and then
providing the number of allocated messaging slots to the information provider.

12. The method of claim 1, further comprising assigning a percentage of a total message slot inventory to each tier, the available inventory of messaging slots in each tier being determined by multiplying the percentage by the total amount of available messaging slots.

13. The method of claim 12, wherein the allocation of messaging slots to information providers is enabled via an interface available to the information providers.

14. The method of claim 13, further comprising:
forming the interface to enable each information provider to at least one of:
enter a message to be delivered to recipients;
select a target profile group of recipients to receive messages;
select one or more parameters relating to the time of delivery of messages; and
perform either a message delivery campaign based on a budget or on delivery of a set number of messages.

15. The method of claim 14, wherein when an information provider elects to perform a message delivery campaign based on delivery of a set number of messages, further comprising:
allocating to each information provider, available messaging slots from a lowest cost per message tier having unallocated messaging slots, and then
providing the cost of utilizing the messaging slots to the information provider.

16. The method of claim 14, wherein when an information provider elects to perform a message delivery campaign based on a budget, further comprising:
allocating to each information provider, available messaging slots from a lowest cost per message tier having unallocated messaging slots until the cost of utilizing the messaging slots equals the budget, and then
providing the number of allocated messaging slots to the information provider.

17. The method of claim 1, wherein the allocation of messaging slots to information providers is enabled via an interface available to the information providers.

18. The method of claim 17, further comprising:
forming the interface to enable each information provider to at least one of:
enter a message to be delivered to recipients;
select a target profile group of recipients to receive messages;
select one or more parameters relating to the time of delivery of messages; and
perform either a message delivery campaign based on a budget or on delivery of a set number of messages.

19. The method of claim 18, wherein when an information provider elects to perform a message delivery campaign based on delivery of a set number of messages, further comprising:

allocating to each information provider, available messaging slots from a lowest cost per message tier having unallocated messaging slots, and then providing the cost of utilizing the messaging slots to the information provider.

20. The method of claim 18, wherein when an information provider elects to perform a message delivery campaign based on a budget, further comprising:

allocating to each information provider, available messaging slots from a lowest cost per message tier having unallocated messaging slots until the cost of utilizing the messaging slots equals the budget, and then providing the number of allocated messaging slots to the information provider.

21. The method of claim 1, wherein the number of tiers is 2, 3, 4 or 5.

22. A system for enabling information providers to schedule delivery of messages, the system allocating messaging slots for use in delivering messages to participating recipients within a mobile communications network during an allocated time period, comprising:

a messaging management system comprising a processor and memory which partition recipients of the advertising messages into a plurality of target profile groups wherein each recipient is allocated to more than one target profile group and determine a total number of available messaging slots for each target profile group, each messaging slot enabling the transmittal of one advertising message to recipients as a SMS, MMS or WAP message, by multiplying the total number of recipients in each target profile group by the number of messages permitted to be delivered to each participating recipient per an advertising time period, and by the allocated time period, the messaging management system defining a plurality of tiers of available messaging slots for each of the target profile groups, each tier containing an available inventory of messaging slots and a cost for delivering a message associated with a respective tier, wherein a lowest cost per message tier has the highest available inventory and a highest cost per message tier has a lowest available inventory, each said tier having a priority for use in scheduling the delivery of the advertising messages, the messaging management system receiving from an advertiser defined target recipients and a number of messages to be delivered; and an interface comprising a processor and memory operatively coupled to said messaging management system, the interface being accessible by information providers to enable the information providers to input messages to said message management system and obtain an allocation of messaging slots based on availability starting from a lowest cost per message tier with unallocated messaging slots and progressing to higher cost per message tiers, the message management system assigning messaging slots to transmit a message to specific recipients based on availability of messaging slots, the advertising management system initially assigning messaging slots from a lowest cost per message tier with unallocated messaging slots and then progressing to the next higher cost per message tier with available messaging slots to assign any of the number of messages to be delivered which are not assigned in the lowest cost per message tier due to all of the messaging slots in the lowest cost per message tier having been filled, and creating a transmitting schedule for messages to the allocated recipients, wherein the availability of the messaging slots in each other target profile group to which the specific recipient is allocated is decreased by a determined weight calculated based on the percentage of total recipients belonging to each target profile group.

23. The system of claim 22, further comprising infrastructure comprising a processor operatively coupled to said message management system to enable delivery of messages from the information providers to a recipient's telecommunications devices, said messages being entered via said interface in accordance with the allocation of said messaging slots.

24. The system of claim 23, wherein the number of tiers is 2, 3, 4 or 5.

25. The system of claim 23, wherein said interface further comprises means for enabling each information provider to at least one of:

select a target profile group of recipients to receive messages;

select one or more parameters relating to the time of delivery of messages; and perform either a message delivery campaign based on a budget or on delivery of a desired number of messages.

26. The system of claim 25, wherein the number of tiers is 2, 3, 4 or 5.

27. The system of claim 25, wherein when an information provider elects to perform a message delivery campaign based on delivery of a desired number of messages, said message management system further comprises means for allocating to each information provider, available messaging slots from a lowest cost per message tier having unallocated messaging slots, and then provide the cost of the messaging slots to the information provider via said interface.

28. The system of claim 27, wherein the number of tiers is 2, 3, 4 or 5.

29. The system of claim 25, wherein when an information provider elects to perform a message delivery campaign based on a budget, said message management system further comprises means for allocating to each information provider, available messaging slots from a lowest cost per message tier having unallocated messaging slots until the cost of the messages equals the budget, and then provide the number of messaging slots to the information provider via said interface.

30. The system of claim 29, wherein the number of tiers is 2, 3, 4 or 5.

31. The system of claim 22, wherein said message management system further comprises means for assigning a percentage of messaging slot inventory to each tier, the number of messages in each tier being determined by multiplying the percentage by the total amount of available messages.

32. The system of claim 31, wherein the number of tiers is 2, 3, 4 or 5.

33. The system of claim 31, wherein said interface further comprises means for enabling each information provider to at least one of:

select a target profile group of recipients to receive messages;

select one or more parameters relating to the time of delivery of messages; and perform either a message delivery campaign based on a budget or on delivery of a desired number of messages.

34. The system of claim 33, wherein the number of tiers is 2, 3, 4 or 5.

35. The system of claim 33, wherein when an information provider elects to perform a message delivery campaign based on delivery of a desired number of messages, said message management system further comprises means for allocating to each information provider, available messaging slots from a lowest cost per message tier having unallocated messaging slots, and then provide the cost of the messaging slots to the information provider via said interface.

36. The system of claim 35, wherein the number of tiers is 2, 3, 4 or 5.

37. The system of claim 33, wherein when an information provider elects to perform a message delivery campaign based on a budget, said message management system further comprises means for allocating to each information provider, available messaging slots from a lowest cost per message tier having unallocated messaging slots until the cost of the messages equals the budget, and then provide the number of messaging slots to the information provider via said interface.

38. The system of claim 37, wherein the number of tiers is 2, 3, 4 or 5.

39. The system of claim 22, wherein said interface further comprises means for enabling each information provider to at least one of:
  select a target profile group of recipients to receive messages;
  select one or more parameters relating to the time of delivery of messages; and
  perform either a message delivery campaign based on a budget or on delivery of a desired number of messages.

40. The system of claim 39, wherein the number of tiers is 2, 3, 4 or 5.

41. The system of claim 39, wherein when an information provider elects to perform a message delivery campaign based on delivery of a desired number of messages, said message management system further comprises means for allocating to each information provide, available messaging slots from a lowest cost per message tier having unallocated messaging slots, and then provide the cost of the messaging slots to the information provider via said interface.

42. The system of claim 41, wherein the number of tiers is 2, 3, 4 or 5.

43. The system of claim 39, wherein when an information provider elects to perform a message delivery campaign based on a budget, said message management system further comprises means for allocating to each information provider, available messaging slots from a lowest cost per message tier having unallocated messaging slots until the cost of the messages equals the budget, and then provide the number of messaging slots to the information provider via said interface.

44. The system of claim 43, wherein the number of tiers is 2, 3, 4 or 5.

45. The system of claim 22, wherein the number of tiers is 2, 3, 4 or 5.

46. A non-transitory computer-readable storage medium storing instructions which, when executed by a computing device, cause the computing device to:
  partition recipients of advertising messages into a plurality of target profile groups wherein each recipient is allocated to more than one target profile group;
  determine a total number of available messaging slots for each target profile group, each messaging slot enabling the transmittal of one advertising message from an advertising management system to recipients as a SMS, MMS, or WAP message, by multiplying the total number of recipients in each target profile group by the number of messages permitted to be delivered to each participating recipient per an advertising time period, and by the allocated time period;
  define a plurality of tiers of available messaging slots for each of the target profile groups, each tier containing an available inventory of messaging slots and a cost for delivering a message associated with a respective tier, wherein a lowest cost per message tier has a highest available inventory and a highest cost per message tier has a lowest available inventory, each said tier having a priority for use in scheduling the delivery of the advertising messages;
  receive from an advertiser parameters defining targeted recipients and a number of messages to be delivered; and
  assign messaging slots to transmit a message to specific recipients based on availability of messaging slots, the advertising management system initially assigning messaging slots from a lowest cost per message tier with unallocated messaging slots and then progressing to the next higher cost per message tier with available messaging slots to assign any of the number of messages to be delivered which were not assigned in the lowest cost per message tier due to all of the messaging slots in the lowest cost per message tier having been filled, and creating a transmitting schedule for messages to the allocated recipients, wherein the availability of the messaging slots in each other target profile group to which the specific recipient is allocated is decreased by a determined weight calculated based on the percentage of total recipients belonging to each target profile group.

* * * * *